United States Patent [19]

Hosaka et al.

[11] Patent Number: 5,494,872

[45] Date of Patent: Feb. 27, 1996

[54] CATALYST AND SOLID CATALYST COMPONENT FOR PREPARING POLYOLEFINS WITH BROAD MOLECULAR WEIGHT DISTRIBUTION

[75] Inventors: Motoki Hosaka, Samukawa; Minoru Terano, Tatsukuchi; Kazuhiro Ishii, Hachioji, all of Japan

[73] Assignee: Toho Titanium Company, Ltd., Chigasaki, Japan

[21] Appl. No.: 281,040

[22] Filed: Jul. 27, 1994

Related U.S. Application Data

[63] Continuation-in-part of Ser. No. 41,171, Apr. 1, 1993, abandoned.

[30] Foreign Application Priority Data

| Apr. 3, 1992 | [JP] | Japan | 4-109070 |
| Apr. 24, 1992 | [JP] | Japan | 4-129835 |
| Apr. 28, 1992 | [JP] | Japan | 4-134493 |
| Jun. 11, 1992 | [JP] | Japan | 4-175907 |
| Jun. 22, 1992 | [JP] | Japan | 4-185722 |

[51] Int. Cl.$^6$ ........................... B01J 31/38
[52] U.S. Cl. .......... 502/115; 502/116; 502/125; 502/127
[58] Field of Search .................. 502/115, 116, 502/125, 127

[56] References Cited

U.S. PATENT DOCUMENTS

| 4,315,835 | 2/1982 | Scata' et al. | 252/429 B |
| 4,816,433 | 3/1989 | Terano et al. | 502/127 |
| 4,983,561 | 1/1991 | Sasaki et al. | 502/107 |
| 4,990,479 | 2/1991 | Ishimaru | 502/125 |
| 5,194,531 | 3/1993 | Toda | 526/125 |

*Primary Examiner*—E. Rollins Cross
*Assistant Examiner*—Timothy H. Meeks
*Attorney, Agent, or Firm*—Oblon, Spivak, McClelland, Maier & Neustadt

[57] ABSTRACT

A novel catalyst and solid catalyst component useful for preparing polyolefins having a broad molecular weight distribution and high stereoregularity.

21 Claims, No Drawings

CATALYST AND SOLID CATALYST COMPONENT FOR PREPARING POLYOLEFINS WITH BROAD MOLECULAR WEIGHT DISTRIBUTION

CROSS REFERENCE TO RELATED APPLICATION

This application is a continuation-in-part of Ser. No. 08/041,171 filed Apr. 1, 1993, now abandoned.

BACKGROUND OF THE INVENTION

This invention relates to a catalyst and a solid catalyst component for preparing polyolefins having a broad molecular weight distribution and a high stereoregularity, particularly, polypropylene or its copolymer thereof, in high yields.

A number of proposals have been made on an olefin polymerization catalyst and a solid catalyst component for preparing polyolefins which permit olefins to be subject to polymerization or copolymerization in the presence thereof. The solid catalyst component conventionally mainly consists of a titanium halide, a magnesium compound and an electron donor compound and the catalyst includes a combinaiton of the solid catalyst component, an organic aluminum compound, a silicon compound and the like.

For Example, Japanese Patent Application Laid-Open Publication No. 3010/1988(63-3010) and the U.S. Pat. No. 4,829,037 assigned to the same assignee as the present application propose an olefin polymerization catalyst which comprises a solid catalyst component (A) prepared by contacting dialkoxy magnesium, a diester of an aromatic dicarboxylic acid, an aromatic hydrocarbon and titanium halides with one another to obtain a product and subsequently subjecting the product to a heating treatment in the powdered state; an organic alumium compound (B); and an organic silicon compound (C). The Japanese patent provides examples directed to a process for polymerizing olefins in the presence of the catalyst.

Japanese Patent Application Laid-Open Publication No. 154705/1988 (63-154705) proposes an olefin polymerization catalyst which comprises a solid catalyst component (A), an organic aluminum compound (E) and a silicon compound (C) and provides examples directed to a process for polymerizing olefins in the presence of the catalyst. The catalyst component (A) for use in the catalyst is prepared by adding titanium tetrachloride to a mixed solution containing a magnesium compound obtained by reacting a magnesium powder with alkylmonohalides in the presence of iodine, tetraalkoxy titanium, aliphatic hydrocarbon and aliphatic alcohol to precipitate a solid substance and adding a diester of phthalic acid thereto to obtain a solid product. The solid product is then brought into contact with titanium tetrachloride in the presence of aromatic hydrocarbon.

U.S. Pat. No. 4,816,433 proposes a solid catalyst component prepared by contacting titanium tetrachloride with a suspension formed of diethoxy magnesium and alkyl benzene, adding a diester of phthalic acid to permit a reaction to be carried out therebetween, to thereby obtain a solid product, and then subjecting the solid product to a contact reaction with titanium chloride in the presence of alkyl benzene, as well as a catalyst for polymerization of olefins comprising the solid catalyst component thus produced, and an organic aluminum compound and an organic silicon compound.

Japanese Patent Application Laid-Open Publication No. 315406/1989 (1-315406) and the U.S. Pat. Nos. 4,970,186 and 5,130,284 propose an olefin polymerization catalyst which comprises a solid catalyst component (A) prepared by forming a suspension of diethoxy magnesium and alkyl benzene, contacting the suspension with titanium tetrachloride and adding a diester of phthalic acid thereto to obtain a solid product which is recovered and washed with alkyl benzene. Subsequently the solid product is brought into contact with titanium tetrachloride in the presence of alkyl benzene, an organic aluminum compound, and an organic silicon compound to prepare the catalyst. The Japanese patent also discloses examples directed to a process for polymerizing olefins in the presence of the catalyst.

Also, U.S. Pat. No. 4,927,797 proposes a catalyst system for olefin polymerization comprising a catalyst component obtained by contacting dialkoxy magnesium, an aromatic hydrocarbon, titanium tetrachloride and a diester of an aromatic dicarboxylic acid with each other, an organic aluminum compound, and an organic silicon compound containing a single cycloalkyl group.

Further, U.S. Pat. No. 4,990,479 proposes a catalyst for olefin polymerization comprising a solid titanium catalyst component, an organoaluminum compound, and a specific organosilicon compound containing a cyclopentyl group, a cyclopentenyl group, a cyclopentadienyl group or a derivative derived from any of these groups. Also, the U.S. patent proposes an olefin polymerization method using the catalyst.

The foregoing catalysts exhibit a degree of activity sufficient to permit elimination tile deashing which removes catalyst residues such as chlorine, titanium and the like remaining in a polymer such as polypropylene or its co-polymer produced, as well as to improve yields of a stereoregular polymer and increase the activity of the catalyst during polymerization. While these catalysts have provided the foregoing benefits, the polyolefins such as polypropylene its co-polymer obtained using these catalysts comprising the highly active catalyst component, organic aluminum compound and silicon compound have a narrow molecular-weight distribution as compared with polyolefins prepared by using the conventional olefin polymerizing catalyst which comprises the titanium trichloride based catalyst component, an organic aluminum compound and an electron donor compound which is added as required. The narrowed molecular-weight distribution causes the formability or moldability of the polyolefin to deteriorate, resulting in some restrictions on the polyolefin's applications. Thus, it is desirable to develop a catalyst for providing a polymer having a broad molecular weight distribution.

Furthermore, it is highly demanded to realize weight-saving of plastics used for automobiles, domestic electric appliances and the like in order to save energy and resources in view of global environment protection recently advocated. In order to solve the problem, it is required to decrease a thickness of the plastics while ensuring strength of the plastics such as impact resistance and the like. Also, In association with the problem, an improvement in crystallinity of resin to increase rigidity of the resin is demanded together with an improvement in molecular weight distribution described above. Concurrently, it is desirable to provide a catalyst for preparation of a polymer exhibiting improved crystallinity.

Various approaches have been tried to improve the molecular weight distribution including the multi-stage polymerization process which provides polyolefins of increased molecular-weight distribution. However, the multi-stage polymerization requires a complicated polymerization operation repeatedly and requires a troublesome treatment for recovering the chelating agent used during the polymerization, which increases the cost of the polymerization process.

In view of the above, Japanese Patent Application Laid Open Publication No. 7703/1991 (3-7703) proposed a process for polymerizing olefins In the presence of an olefin polymerizing catalyst comprising a solid titanium catalyst component consisting essentially of magnesium, titanium, halogen and an electron donor compound; an organic aluminum compound; and two types of organic silicon compounds serving as the electron donor. The Japanese patent states that the proposed polymerization process eliminates the need for the troublesome multi-stage polymerization process as described above and provides polyolefins of a molecular-weight increased to an intended degree. However, the proposed process likewise renders the polymerization operation troublesome because it requires the use of two types of organic silicon compounds as the electron donor.

Accordingly, a need continues to exist for a polymerization process which produces polyolefins with a broad molecular weight distribution at high levels or catalyst activity.

Also, in connection with high crystallinity and high rigidity, polypropylene resin for a high rigidity molded product is proposed in U.S. Pat. No. 4,522,994. However, a catalyst used for preparation of the product proposed in the U.S. patent comprises an improvement of titanium trichloride obtained by reacting titanium tetrachloride with an organic aluminum compound and is substantially decreased in activity as compared with a catalyst of the high-activity type.

Further, U.S. Pat. No. 5,194.531 proposes a method for polymerizing olefins using a catalyst comprising a solid catalyst component of the high-activity type, an organic aluminum compound, and a specific organic silicon compound containing a hydrocarbon group of which a carbon atom attached to a silicon atom is a tertiary carbon atom, to thereby prepare olefin polymers with a broad molecular weight distribution with high yields.

However, the U.S. patent merely suggests that the above-described method for preparation of polyolefins provides olefin polymers with a broad molecular weight distribution with high yields and therefore falls to refer to an improvement in crystallinity of the polymers obtained and its rigidity. Thus, it is highly desirable to develop a catalyst component and a catalyst each of the high-activity type for preparation of polymers which are capable of concurrently solving the above-described two problems or exhibiting a broad molecular weight distribution and high crystallinity.

SUMMARY OF THE INVENTION

The inventors have made efforts to provide, in a more simplified manner, a catalyst and a solid catalyst component for preparing polyolefins with a broad molecular weight distribution and a catalyst and a solid catalyst component for preparing polyolefins with a broad molecular weight distribution and high crystallinity while keeping a polymerization activity at an increased level and ensuring preparation of stereoregular polymers with high yields. As a result, the present invention has been made while taking notice of the fact that employment of a specific solid catalyst component and a specific catalyst comprising a combination of the specific solid catalyst component, a specific organic silicon compound and a specific organic aluminum compound for preparation of polyolefins permits the above-described two problems to be concurrently solved.

Accordingly, it is an object of the present invention to provide a catalyst and a solid catalyst component for preparation of polyolefins which are capable of preparing polyolefins with a broad molecular weight distribution and/or high crystallinity while exhibiting high polymerization activity and ensuring preparation of stereoregular polymers with high yields.

In accordance with the first aspect of the present invention, a catalyst for preparing polyolefins with a broad molecular weight distribution is provided. The catalyst for preparing polyolefins with a broad molecular weight distribution, consisting essentially of a solid catalyst component [A1], an organic aluminum compound [B1], and an organic silicon compound [C1] having the formula (I);

wherein $C_6H_{11}$ is a cyclohexyl group and $R^0$ is an alkyl group having 1 to 5 carbon atoms, and wherein said solid catalyst component [A1] is prepared according to a procedure comprising the step of:

(i) suspending a dialkoxy magnesium in aromatic hydrocarbon, (ii) contacting the dialkoxy magnesium with a diester of phthalic acid and titanium tetrachloride to carry out reaction, and to obtain a solid material which is followed by washing with an aromatic hydrocarbon, (iii) contacting titanium tetrachloride with said solid material.

One of features of the catalyst according to the first aspect of the present invention, as described above, is in that it comprises a combination of the solid catalyst component [A1] prepared according to the specified procedure, the organic aluminum compound [B1] and the specific organic silicon compound [C1]. The catalyst thus prepared permits polyolefins with a highly broad molecular weight distribution to be prepared with high yields. Also, use of the spherical dialkoxy magnesium for preparation of the solid catalyst component permits the solid catalyst component prepared to be spherical, so that use of the solid catalyst component leads to preparation of a polymer powder having a spherical configuration and exhibiting satisfactory morphology. This effectively prevents troubles such as, for example, clogging during transfer of the polymers due to the fact that the polymers prepared are in the form of a fine powder. Thus, the present invention exhibits an unexpected advantage of solving problems encountered during preparation of polyolefins.

In accordance with a second aspect of the present invention, a solid catalyst component [A2] is provided which is prepared by reaction of ingredients or compounds (a), (b), (c) and (d), wherein the ingredient or compound (a) is a magnesium compound represented by tile following general formula (II):

$$Mg(OR^1)_{2-m}X_m \quad \text{(II)}$$

wherein $R^1$ indicates at least one selected from the group consisting of an alkyl group having 1 to 4 carbon atoms and a phenyl group. X is a halogen atom such as chlorine, bromine or iodine and m is an integer of 0 or 1;

the ingredient or compound (b) is a titanium compound represented by the following general formula (III):

$$Ti(OR^2)_n X_{4-n} \quad \text{(III)}$$

wherein $R^2$ is an alkyl group having 1 to 4 carbon atoms X is halogen atom such as chlorine, bromine or iodine and n is an integer of 0, 1, or 2;

the ingredient or compound (c) is at least one diester of phthalic acid represented by the following formula (IV):

$$\phi(COOR^3)(COOR^4) \quad \text{(IV)}$$

wherein ($\phi$ indicates a phenyl group,) $R^3$ and $R^4$ each are an alkyl group having 1 to 4 carbon atoms and may be identical with or different from each other; and the ingredient or compound (d) Is at least one diester of phthalic acid represented by the following general formula (V):

$$\phi(COOR^5)(COOR^6) \quad \text{(V)}$$

wherein $R^5$ and $R^6$ each are an alkyl group having 4 to 12 carbon atoms, in which the number of carbon atoms of $R^5$ and $R^6$ in total is 10 to 20, and may be identical with or different from each other.

In accordance with a third aspect of the present invention, a catalyst system for olefin polymerization is provided which comprises a combination of the above-described solid catalyst component [A2], and organic aluminum compound [B2] (hereinafter also referred as component [B2]) and organic silicon compound [C] (hereinafter also referred as component [C]), wherein the component [B2] is at least one organic aluminum compound represented by the following general formula (VI):

$$R^7_y AlY_{3-y} \quad \text{(VI)}$$

wherein $R^7$ is an alkyl group having 1 to 4 carbon atoms, Y is any one of hydrogen, chlorine, bromine and iodine, and y is in the range of 0 y 3; and the component [C2] is at least one silicon compound represented by the following general formula (VII):

$$R^8_z Si(OR^9)_{4-z} \quad \text{(VII)}$$

wherein $R^8$ is selected from the group consisting of an alkyl group, a cycloalkyl group, a phenyl group, a vinyl group, an aryl group and an aralkyl group and may be identical or different; $R^9$ is selected from the group consisting of an alkyl group having 1 to 4 carbon atoms, a cycloalkyl group, a phenyl group, a vinyl group, an alkyl group and an aralkyl group and may be identical or different; and z is an integer of 0 to 3.

One of essential features of each of the solid catalyst component [A2] and catalyst system of the present invention is that the solid catalyst component [A2] is prepared by using at least one of diester of phthalic acid of the general formula (IV) and at least one of diester of phthalic acid of the general formula (V). The catalyst system of the present invention comprises a combination of the solid catalyst component [A2] with the specific organic aluminum compound [B2] and silicon compound [C2]. An olefin polymer prepared using the catalyst system has a broad molecular weight distribution and very high crystallinity and can be obtained in high yield. The olefin polymer using the catalyst system of the present invention exhibits increased physical properties such as processability during molding of the olefin polymer, rididty, impact strength and flexural modulus. The conventional Mg-containing solid catalyst component and catalyst system fail to exhibit such excellent physical properties.

DETAILED DESCRIPTION OF THE INVENTION

A catalyst for preparing polyolefins with a broad molecular weight distribution, consisting essentially of a solid catalyst component [A1], an organic aluminum compound [B1], and an organic silicon compound [C1] having the formula [I];

$$Si(C_6H_{11})_2(OR^0)_2 \quad \text{[I]}$$

wherein $C_6H_{11}$ is a cyclohexyl group and $R^0$ is an alkyl group having 1 to 5 carbon atoms, and wherein said solid catalyst component [A1] is prepared according to a procedure comprising the step of:

(i) suspending a dialkoxy magnesium in aromatic hydrocarbon, (ii) contacting the dialkoxy magnesium with a diester of phthalic acid and further contacting titanium tetrachloride to carry out reaction, and to obtain a solid material which is followed by washing with an aromatic hydrocarbon, (iii) contacting a titanium tetrachloride with said solid material.

The preferred dialkoxy magnesium used in preparation of the solid catalyst component [A1] is diethoxy magnesium, di-n-butoxy magnesium, diphenoxy magnesium, di-n-propoxy magnesium, di-sec-butoxy magnesium, di-tert-butoxy magnesium, diisopropoxy magnesium and the like. Diethoxy magnesium is most preferred.

Also, in the present invention, the dialkoxy magnesium used for preparation of the solid catalyst component (A) is at least one dialkoxy magnesium and granular or powdery. The dialkoxy magnesium used has either an irregular shape or a spherical shape. Use of the spherical diethoxy magnesium permits powdery polymers having a more satisfactory granular shape and a narrower particle size distribution to be produced, to thereby facilitate handling of the produced powdery polymers during preparation of the polymers, leading to elimination of troubles such as clogging and the like due to fine powders contained in the powdery polymers produced.

The spherical diethoxy magnesium is not necessarily required to be round. For example, it may have an elliptic shape or a potato-like shape. More specifically, a degree l/w of spherical shape of the particles is within a range of 3 or less, preferably 1 to 2 and more preferably 1 to 1.5, wherein 1 indicates a length of the particle in a major axis direction thereof and w is that in a minor axis direction thereof.

The dialkoxy magnesium suitable for use in the present invention has an average particle diameter between 1 micron and 200 microns. Preferably, it is between 5 microns and 150 microns.

The spherical diethoxy magnesium described above has an average particle diameter between 1 micron and 100 microns, preferably between 5 microns and 50 microns and more preferably between 10 microns and 40 microns. Also, the diethoxy magnesium used desirably has a sharp particle size distribution containing fine and coarse powders in a decreased amount. More specifically, the diethoxy magnesium contains particles of 5 microns or less in an amount of 20% or less and preferably 10% or less and particles of 100 microns or more in an amount of 10% or less and preferably 5% or less. A particle size distribution ln (D90/D10) of the diethoxy magnesium is 3 or less and preferably 2 or less, wherein D90 indicates a particle diameter corresponding to 90% in integrated particle size and D10 is a particle diameter corresponding to 10% integrated particle size.

In the preparation of the solid component [A1], an aromatic hydrocarbon liquid at a normal (room) temperature is used as a solvent/suspension media. The preferred aromatic hydrocarbon is selected from toluene, xylene, ethyl benzene, propylbenzene, trimethyl benzene and the like.

The diester of phthalic acid used to prepare the solid catalyst component [A1] includes, for example, dimethyl phthalate, diethyl phthalate, diisopropyl phthalate, di-n-butyl phthalate, diisobutyl phthalate, di-n-amyl phthalate, diisoamyl phthalate, ethyl-n-butyl phthalate, ethylisobutyl phthalate, ethyl-n-propyl phthalate, diisooctyl phthalate, diisodecyl phthalate, diisopentyl phthalate, di-n-octyl phthalate, diisoheptyl phthalate or the like.

The solid catalyst component [A1] may be prepared by preparing a mixture solution of aromatic hydrocarbon which is liquid at a normal temperature and titanium tetrachloride at a volume ratio of 1 or less to the aromatic hydrocarbon; adding a suspension of spherical diethoxy magnesium, aromatic hydrocarbon which is liquid at a normal temperature and a diester of phthalic acid to the solution to carry out reaction therebetween at a temperature of from 80° C. to 125° C., to thereby obtain a reaction product; washing the reaction product with aromatic hydrocarbon; and in the presence of aromatic hydrocarbon which is liquid at a normal temperature adding titanium tetrachloride at a volume ratio of 1 or less to the aromatic hydrocarbon to the reaction product to carry out reaction therebetween at a temperature of from 80° C. to 125° C.

The organic aluminum compound [B1] used together with the solid catalyst component [A1] in the present invention includes trialkyl aluminum such as triethyl aluminum, triisobutyl aluminum or the like; alkyl aluminum halide such as diethyl aluminum chloride, ethyl aluminum sesquichloride or the like; and any combination or mixture thereof.

The organic silicon compound [C1] used together with the solid catalyst component [A1] and the organic aluminum component [B1] in the present invention is represented by the following general formula [I];

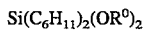

wherein $C_6H_{11}$ is an cyclohexyl group and $R^0$ is an alkyl group having 1 to 5 carbon atoms. More specifically, it is any one selected from the group consisting of dicyclohexyldimethoxy silane, dicyclohexyldiethoxy silane, dicyclohexyldipropoxy silane, dicyclohexyldibutoxy silane, and the like. Dicyclohexyldimethoxy silane is preferably used for this purpose.

Ratios among the components [A1] to [C1] used are not limited to any specific values so long as they do not deteriorate the advantages of the present invention. In general, the organic aluminum component [B1] is used at a molar ratio of 5 to 1000 to the titanium atom content of the catalyst component [A1] and the organic silicon compound [C1] is used at a molar ratio of 0.002 to 0.5 to the organic aluminum component [B1].

The solid catalyst component [A2] of the present invention is obtained by contacting the magnesium compound (a) represented by the general formula (II), the titanium compound (b) represented by the general formula (III), at least one diester of phthalic acid represented by the general formula (IV) and at least one diester of phthalic acid represented by the general formula (V) with each other.

The magnesium compound (a) used in the present invention is at least one compound represented by the following general formula (II):

wherein $R^1$ indicates at least one selected from the group consisting of alkyl groups having carbon atoms of 1 to 4 in number and phenyl groups, X is halogen atom such as chlorine, bromine or iodine and m is an integer of 0 or 1.

More particularly, dialkoxy magnesium used for the magnesium compound (a) includes, for example, dimethoxy magnesium, diethoxy magnesium, di-n-propoxy magnesium, di-iso-propoxy magnesium, di-n-butoxy magnesium, di-iso-butyl magnesium, methoxyethoxy magnesium, methoxy (n-propoxy) magnesium, n-butoxymethoxy magnesium, ethoxy (n-propoxy) magnesium and the like. Diaryloxy magnesium used therefor includes, for example, diphenoxy magnesium. Alkoxy magnesium halide used therefor includes, for example, methoxy magnesium chloride, ethoxy magnesium chloride, methoxy magnesium bromide, ethoxy magnesium bromide and the like. Aryloxy magnesium halide used therefor includes, for example, phenoxy magnesium chloride, phenoxy magnesium bromide and the like. Among the above-described magnesium compounds, dialkoxy magnesium is preferably used. In particular, dimethoxy magnesium, diethoxy magnesium and dipropoxy magnesium are preferably used and diethoxy magnesium is more preferably used. Any one of the magnesium compounds may be used. Alternatively, two or more of the compounds may be used in combination.

Also, in the present invention, the dialkoxy magnesium used for preparation of the solid catalyst component [A2] is at least one dialkoxy magnesium having 1 to 3 carbon atoms and granular or powdery. The dialkoxy magnesium used has either an irregular shape or a spherical shape. Use of the spherical diethoxy magnesium permits powdery polymers having a more satisfactory granular shape and a narrower particle size distribution to be produced, to thereby facilitate handling of the produced powdery polymers during preparation of the polymers, leading to elimination of troubles such as clogging and the like due to fine powders contained in the powdery polymers produced.

The spherical diethoxy magnesium is not necessarily required to be round. For example, it may have an elliptic shape or a potato-like shape. More specifically, a degree 1/w of spherical shape of the particles is within a range of 3 or less, preferably 1 to 2 and more preferably 1 to 1.5, wherein 1 indicates a length of the particle in a major axis direction thereof and w is that in a minor axis direction thereof.

The dialkoxy magnesium suitable for use in the present invention has an average particle diameter between 1 micron and 200 microns. Preferably, it is between 5 microns and 150 microns.

The spherical diethoxy magnesium described above has an average particle diameter between 1 micron and 100 microns, preferably between 5 microns and 50 microns and more preferably between 10 microns and 40 microns. Also, the diethoxy magnesium used desirably has a sharp particle size distribution containing fine and coarse powders in a decreased amount. More specifically, the diethoxy magnesium contains particles of 5 microns or less in an amount of 20% or less and preferably 10% or less and particles of 100 microns or more in an amount of 10% or less and preferably 5% or less. A particle size distribution in (D90/D10) of the diethoxy magnesium is 3 or less and preferably 2 or less, wherein D90 indicates a particle diameter corresponding to 90% in integrated particle size and D10 is a particle diameter corresponding to 10% in integrated particle size.

The titanium compound (b) used for preparation of the solid catalyst component [A2] is at least one of each of titanium tetrahalide and alkoxy titanium halide represented by the following general formula (III):

$$Ti(OR^2)_n X_{4-n} \quad (III)$$

wherein $R^2$ is an alkyl group having 1 to 4 carbon atoms, x is a chlorine atom, a bromine atom or an iodine atom, and n is an integer of 0, 1 or 2.

More particularly, titanium tetrahalide includes, for example, $TiCl_4$, $TiBr_4$, $TiI_4$ and the like. Alkoxy titanium halide includes, for example, $Ti(OCH_3)Cl_3$, $Ti(OC_2H_5)Cl_3$, $Ti(OC_3H_7)Cl_3$, $Ti(O_n-C_4H_9)Cl_3$, $Ti(OCH_3)_2Cl_2$, $Ti(OC_2H_5)_2Cl_2$, $Ti(OC_3H_7)_2Cl_2$, $Ti(O_n-C_4H_9)_2Cl_2$, $Ti(OCH_3)_3Cl$, $Ti(OC_2H_5)_3Cl$, $Ti(OC_3H_7)_3Cl$, $Ti(O_n-C_4H_9)_3Cl$ and the like. Among the compounds, titanium tetrahalide is preferably used. In particular, $TiCl_4$ is preferably used. Any one of the titanium compounds may be used. Alternatively, two or more of the compounds may be used in combination.

In addition, for preparation of the solid catalyst component [A2] of the present invention, at least two different diesters of phthalic acid are used. More particularly, at least one diester of phthalic acid (c) represented by the general formula (IV) (hereinafter also referred to as "first ester") and at least one diester of phthalic acid (d) represented by the general formula (V) (hereinafter also referred to as "second ester") are used for this purpose:

$$\phi(COOR^3)(COOR^4) \quad (IV)$$

wherein $R^3$ and $R^4$ each are an alkyl group having 1 to 4 carbon atoms and may be identical with or different from each other; and $$\phi(COOR^5)(COOR^6) \quad (V)$$

wherein $R^5$ and $R^6$ each are an alkyl group having 4 to 12 carbon atoms, in which the number of carbon atoms in total is 10 to 20, and may be identical with or different from each other.

The diester of phthalic acid (c) represented by the general formula (IV) or the first ester includes, for example, dimethyl phthalate, diethyl phthalate, di-n-propyl phthalate, di-iso-propyl phthalate, di-n-butyl phthalate, di-iso-butyl phthalate, ethylmethyl phthalate, iso-butyl methyl phthalate, ethyl-n-propyl phthalate, n-butyl ethyl phthalate and the like. At least one of the compounds may be used.

The diester of phthalic acid (d) represented by the general formula (V) or the second ester includes, for example, di-n-pentyl phthalate, di-iso-pentyl phthalate, dihexyl phthalate, di-n-heptyl phthalate, di-n-octyl phthalate, bis (2-methylhexyl) phthalate, di-n-nonyl phthalate, di-iso-decyl phthalate, bis (2,2-dimethylheptyl) phthalate, n-butyl (iso-hexyl) phthalate, n-butyl (iso-octyl) phthalate, n-pentylhexyl phthalate, n-pentyl (iso-hexyl) phthalate, iso-pentyl heptyl phthalate, n-pentyl (iso-octyl) phthalate, n-pentyl (iso-nonyl) phthalate, iso-pentyl (n-decyl) phthalate, n-pentyl (undecyl) phthalate, iso-pentyl (iso-hexyl) phthalate, n-hexyl (iso-octyl) phthalate, n-hexyl (iso-nonyl) phthalate, n-hexyl (n-decyl) phthalate, n-heptyl (iso-octyl) phthalate, n-heptyl (iso-nonyl) phthalte, n-heptyl (neo-decyl) phthalate, iso-octyl (iso-nonyl) phthalate and the like. At least one of the compounds may be used for this purpose.

A combination of the first and second esters is not subject to any specific restriction. However, the first and second esters are so selected that a difference between the total carbon number of $R^3$ and $R^4$ of the first ester and that of $R^5$ and $R^6$ of the second ester is 6 or more, preferably 8 to 18, more particularly 10 to 18, and most preferably 10 to 16. The words "first" and "second" of the first and second esters do not indicate an order of addition of the esters. Thus, the second ester may be added prior to the first ester. Alternatively, a combination of the second ester with the first ester may be first added and then the first ester may be added. Examples of the preferred combination therebetween are listed as follows:

| First Ester | Second Ester |
|---|---|
| 1. diethyl phthalate | di-n-pentyl phthalate |
| 2. diethyl phthalate | mixture of phthalates of which $R^5$ and $R^6$ are alkyl group having 6 to 12 carbon atoms |
| 3. diethyl phthalate | bis (2-ethylhexyl) phthalate/ |
| 4. dimethyl phthalate | di-iso-pentyl phthalate |
| 5. dimethyl phthalate | bis (2-ethylhexyl) phthalate |
| 6. di-n-propyl phthalate | bis (2-methylhexyl) phthalate/ bis (2-ethylhexyl) phthalate |
| 7. diethyl phthalate | di-n-butyl phthalate/ bis (2-ethylhexyl) phthalate |
| 8. dimetyl phthalate/ diethyl phthalate | bis (2-ethylhexyl) phthalate |
| 9. dimethyl phthalate/ diethyl phthalate | bis (2-ethylhexyl) phthalate/ di-n-hexyl phthalate |
| 10. diethyl phthalate/ di-iso-butyl phthalate | bis (2-ethylhexyl) phthalate di-n-hexyl phthalate |
| 11. diethyl phthalate/ di-iso-butyl phthalate | bis (2-ethylhexyl) phthalate |

For preparation of the solid catalyst component [A2] of the present invention, it is required to combine at least one first ester and at least one second ester with each other. A combination of a kind of the second ester and a kind of the first ester may be first added and then two different kinds of the first ester may be added. It is essential that at least a kind of the first ester and at least a kind of the second ester are used in combination. In addition to the first and second esters, at least one of any additional electron donor compounds such as any diester of phthalic acid mono- or di-ester of cycloalkyl carboxylic acid, ester of aromatic monocarboxylic acid such as benzoic acid, diester of dicarboxylic acid such as adipic acid, carbonic ester, ether and the like may be used. Examples of the preferred combination are as follows:

| First Ester | Second Ester | Additional Electron Donor compound |
|---|---|---|
| 1. diethyl phthalate | di-n-octyl phthalate | ethyl benzoate |
| 2. diethyl phthalate | bis (2-ethylhexyl) phthalate | ethyl p-toluylate |
| 3. di-n-propyl phthalate | bis (2-ethylhexyl) phthalate | diethyl carbonate |
| 4. diethyl phthalate | bis (2-ethylhexyl) phthalate | di-iso-decyl adipate |
| 5. diethyl phthalate | bis (2-ethylhexyl) phthalate | diethyl ether |

The solid catalyst component [A2] obtained by contacting at least one of each of the first and second esters different in the number of carbon atoms with the magnesium compound and titanium compound renders a polyolefin molecular weight distribution highly broad and extensively improves the crystallinity.

(Process for Manufacturing Solid Catalyst Component [A2])

The solid catalyst component [A2], as described above, is prepared by contacting the following ingredients with each other:

Ingredient (a): magnesium compound represented by the general formula (II),

Ingredient (b): titanium compound represented by the general formula (III),

Ingredient (c): diester of phthalic acid represented by the general formula (IV) (first ester), and Ingredient (d): diester of phthalic acid represented by the general formula (V) (second ester).

The ingredients described above may be contacted with each other directly or in an inert organic solvent. The inert organic solvent may include, for example, saturated hydrocarbon such as hexane, heptane, cyclohexane or the like; aromatic hydrocarbon such as benzene, toluene, xylene, ethyl benzene or the like; halogenated hydrocarbon such as orthodichloro benzene, methylene chloride, carbon tetrachloride, dichloroethane or the like; and the like. In particular, an aromatic hydrocarbon solvent having a boiling point between 90° C. and 150° C. such as, for example, benzene, toluene, xylene and ethyl benzene is preferable used. The amount of the solvent to be used is not subject to any specific restriction, however, it is preferably within a range of 0.1 to 10 based on a volume ratio to the ingredient (b).

An order of contact between the ingredients is not subject to any specific restriction. However, contact of at least the ingredient (c) is preferably carried out at a temperature below that of the ingredient (d), therefore, the ingredient (a) or the ingredients (a) and (b) should be first contacted with the ingredient (c) and then preferably contacted with the ingredient (d) at a higher temperature. Also, the ingredients may be repeatedly contacted with each other. In particular, repeated contact between the ingredients (b) and (c) contributes to an improvement in molecular weight distribution and crystallinity.

Procedures of contact between the ingredients will be exemplified as follows:

case 1. (a)+(b)→(c)→(d)
case 2. (a)+(b)→(c)→(d)→(b)
case 3. (a)+(b)→(c)→(d)→(b)→(b)
case 4. (a)+(b)→(c)→(d)→(c)→(b)
case 5. (a)+(b)→(c)→(d)→(b)→(c)
case 6. (a)+(b)→(c)→(d)→(b)→(d)
case 7. (a)+(b)→(c)→(d)→(c)→(d)→(b)
case 8. (a)+(b)→(c)→(d)→(b)→(c)+(d)→(b)
case 9. (a)+(c)→(b)→(d)
case 10. (a)+(c)→(b)→(d)→(b)
case 11. (a)+(c)→(b)→(b)→(d)
case 12. (a)+(c)+(d)→(b)→(b)
case 13. (a)+(c)+(d)→(b)→(b)→(c)

Now, the process of preparation of the solid catalyst component [A2] will be described with reference to the following examples.

EXAMPLE 1

First, the ingredients (a) and (b) are contacted with each other at a temperature between −20° C. and 100° C., preferably between −10° C. and 70° C. and more preferably between 0° C. and 30° C. in an organic solvent such as toluene and then subject to a reaction therebetween at a temperature between 0° C. and 130° C. and preferably between 70° C. and 120° C. Then, the ingredient (c) is added to the mixture for contact therewith at a temperature between −20° C. and 130° C. and preferably between 30° C. and 70° C., followed by addition of the ingredient (d) thereto for contact therewith at a temperature between −20° C. and 130° C., preferably between 10° C. and 130° C. and more preferably between 80° C. and 115° C. A temperature at which contact between the ingredients by addition is carried out is preferably kept at a level below that of the ingredient (d).

The ingredient (c) and/or the ingredient (d) is not restricted to one-time addition. They may be repeatedly added as indicated by, for example, the above-described cases 4 to 6. More particularly, the first addition of the ingredient (c) is carried out at a temperature between −10° C. and 10° C. and the second addition may be made at a temperature between 40° C. and 70° C. which is different from that of the first addition. Also, the first addition of the ingredient (d) may be carried out at a temperature between 40° C. and 70° C. and the second one may be carried out at a different temperature such as between 80° C. and 115° C.

EXAMPLE 2

As indicated by the above-described cases 9 to 11, initially the ingredients (a) and (c) are contacted with each other in an organic solvent at a temperature between −20° C. and 70° C., preferably between 0° C. and 50° C. and more preferably between 0° C. and 30° C. and then contacted with the ingredient (b) at a temperature between −20° C. and 100° C. preferably between 0° C. and 30° C. and most preferably between 10° C. and 30° C. Then, contact of the ingredient (d) is carried out at a temperature between −20° C. and 130° C., preferably between 10° C. and 130° C. and most preferably 80° C. and 115° C. After contact between the ingredients is completed, a reaction therebetween is carried out at a temperature between 0° C. and 130° C. and preferably between 70° C. and 120° C.

The ingredients (c) and (d) are not limited to one-time addition. For example, the ingredient (c) may be first added to an organic solvent slurry containing the ingredient (a) at a temperature between −10° C. and 10° C. and then further added thereto at a higher temperature such as, for example, that between 40° C. and 70° C. Also, the first addition of tile ingredient (d) may be carried out at a temperature between 40° C. and 70° C. and the second one may be carried out at a different temperature such as that between 80° C. and 115° C.

EXAMPLE 3

As seen in the cases 12 and 13 described above, the ingredients (a) and (c) and the ingredient (d) are initially contacted with each other in an organic solvent at a temperature between −20° C. and 120° C., preferably between 0° C. and 100° C. and more preferably between 10° C. and 70° C. Then, the ingredient (b) is contacted therewith at a temperature between −20° C. and 100° C., preferably 0° C. and 30° C. and more preferably 10° C. and 60° C. After the contact is completed, the temperature is increased to permit reaction of the mixture to be carried out at, for example, a temperature between 0° C. and 130° C. and preferably 70° C. and 120° C. Then, the ingredients (c) and/or (d) are added again for contact at a temperature different from that in the first contact described above, resulting in a reaction being carried out. For example, the first addition and second addition may be carried out at different temperature such as, for example, a temperature between 10° C. and 30° C. and that between 30° C. and 70° C.

A length of time during which contact between the ingredients is carried out is not subject so any specific restriction. However, it is within a range preferably between 30 minutes and 5 hours and more preferably between 1 hour and 3 hours. Also, additional ingredients may be added after an intermediate product obtained by the reaction between the ingredients is separated and washed with an organic solvent. Repeated addition of the ingredient (b) further improves the molecular weight distribution and crystallinity.

The amount of each of the ingredients used in preparation of the solid catalyst component [A2] is not specified in a fixed range because it is varied depending on a manner of the preparation. However, for example, it may be generally defined that the ingredients (b), (c) and (d) are in amounts of 0.5 to 100 mols and preferably 1 to 10 mols, 0.1 to 0.5 mol and preferably 0.02 to 0.2 mol, and 0.01 to 0.5 mol and preferably 0.02 to 0.3 mol based on 1 mol of the ingredient (a), respectively.

The solid catalyst component [A2] of the present invention thus prepared contains at least three type of diester of phthalic acid ingredients (e), (f) and (g) represented by the following general formulas (VIII), (IX) and (X), respectively: Ingredient (e):

$$\phi(COOR^{10})(COOR^{11}) \quad\quad (VIII)$$

wherein $R^{10}$ and $R^{11}$ each are an alkyl group having 1 to 4 carbon atoms and may be identical with or different from each other; Ingredient (f):

$$\phi(COOR^{14})(COOR^{15}) \quad\quad (IX)$$

wherein $R^{14}$ and $R^{15}$ are an alkyl group having 1 to 12 carbon atoms and $R^{14}$ and $R^{15}$ may be identical with or different from each other; and Ingredient (g):

$$\phi(COOR^{12})(COOR^{13}) \quad\quad (X)$$

where in $R^{12}$ and $R^{13}$ each are an alkyl group having 4 to 12 carbon atoms, in which the number of carbon atoms in total is 10 to 20, and may be identical with or different form each other.

The ingredient (e) is the same as the ingredient (c) and contains at least one of the ingredients described above in connection with the ingredient (c). The ingredient (g) is the same as the ingredient (d) described above and contains at least one of the compounds described above in connection with the ingredient (d). The ingredient (f) is diester of phthalic acid produced by subjecting diester of phthalic acid of each of the ingredients (c) and (d) and the MK compound of the ingredient (a) or the Ti compound of the ingredient (b) to a reaction, leading to an exchange reaction among the alkyl groups $R_1$, $R_2$, $R_3$, $R_4$, $R_5$ and $R_6$ of the respective ingredients. Therefore, $R_{14}$ and $R_{15}$ each are an alkyl group having 1 to 12 carbon atoms and different from the ingredients (e) and (g). The ingredient (f) includes, for example, n-butylmethyl phthalate, n-butylmethyl phthalate, n-butyl (n-propyl) phthalate, iso-butylmethyl phthalate, iso-butylethyl phthalate, iso-butyl (n-propyl) phthalate, n-butyl (2-ethylhexyl) phthalate, iso-butyl (2-ethylhexyl) phthalate, methyl (n-pentyl) phthalate, ethyl (n-pentyl) phthalate, n-pentyl (n-propyl) phthalate, iso-pentyl (n-propyl) phthalate, n-hexylmethyl phthalate, ethyl (n-hexyl) phthalate, hexyl (n-propyl) phthalate, n-heptylemetyl phthalate, ethyl (n-heptyl) phthalate, n-heptylemetyl phthalate, ethyl (n-heptyl) phthalate, ethyl (n-octyl) phthalate, ethyl (2-ethylhexyl) phthalate, n-octyl (n-propyl) phthalate, methyl (n-nonyl) phthalate, ethyl (n-nonyl) phthalate, n-nonyl (n-propyl) phthalate, n-decylmethyl phthalate, n-decylethyl phthalate, n-decyl (n-propyl) phthalate, methyl (n-undecyl) phthalate; ethyl (n-undecyl) phthalate, n-propyl (n-undecyl) phthalate, n-propyl (n-dodecyl) phthalate and the like.

The ingredients (e), (f) and (g) each of which is the diester of phthalic acid contained in the solid catalylst component [A2] of the present invention in an amount of 1 to 15 weight % and preferably 3 to 10 weight %, 0 to 10 weight % and preferably 0 to 7 weight %, and 0.5 to 15 by weight % and preferably 1 to 7 weight % by weight of the component [A2]. Also, the total content of the ingredients (e), (f) and (g) in the solid catalyst component [A2] is 5 to 50 weight % and preferably 7 to 30 weight % by weight of the component [A2].

Also, the solid catalyst component [A2] contains, in addition to the above-described diester of phthalic acid, Mg, Ti and halogen as its essential ingredients. Ti is contained in an amount of 0.01 to 0.2 and preferably 0.02 to 0.1 at an atomic ratio based on 1 Mg atom. Halogen is contained in an amount of 10 to 100 and preferably 20 to 60 at the atomic ratio based on 1 Mg atom. The solid catalyst component [A2] has a surface area of 50 to 500 m³/g and preferably 150 to 500 m³/g. Also, it has an average particle size of 3 to 150µm and preferably 5to 50 µm.

In accordance with a third aspect of the present invention, a catalyst system for olefin polymerization is provided which is prepared using the above-described solid catalyst component [A2] and components [B2] and [C2].

The component [B2] is at least one organic aluminum compound represented by the following general formula (VI)

$$R^7AlY_{3-y} \quad\quad (VI)$$

wherein $R^7$ is an alkyl group having 1 to 4 carbon atoms, Y is any one of hydrogen, chlorine, bromine and iodine, and y is in a range of $0<y\leq 3$.

The component [C2] is at least one silicon compound represented by the following general formula (VII):

$$R^8_zSi(OR^9)_{4-z} \quad\quad (VII)$$

wherein $R^8$ is selected from the group consisting of an alkyl group, a cycloalkyl group, a phenyl group, a vinyl group, allyl group and aralkyl group and may be the same or different; $R^9$ is selected from the group consisting of an alkyl group having 1 to 4 carbon atoms, a cycloalkyl group, a phenyl group, a vinyl group, allyl group and aralkyl group and may be the same or different; and z is an integer of 0 to 3.

More specifically, the organic aluminum compounds for the component [B2] include, for example, triethyl aluminum, diethyl aluminum chloride, tri-iso-butyl aluminum, diethyl aluminum bromide, ethyl aluminum hydride and the like. At least one of the organic aluminum compounds are used for this purpose. Triethyl aluminum and tri-isobutyl aluminum are preferably used.

The silicon compounds for the component [C2], in which, for example, z is an integer of 3, $R^8$ is an alkyl group having 1 to 4 carbon atoms and $R^9$ is alkyl group having 1 to 4 carbon atoms, include, for example, trimethyl methoxysilane, trimethyl ethoxysilane, tri-n-propyl methoxysilane, tri-n-propyl ethoxysilane, tri-n-butyl methoxysilane, tri-isobutyl methoxysilane, trl-t-butyl methoxysilane, tri-n-butyl ethoxysilane and the like.

The silicon compounds, in which, for example, z is an integer of 3, $R^8$ is a cycloalkyl group and $R^9$ is an alkyl group, include tricyclohexyl methoxysilane, tricyclohexyl ethoxysilane and the like.

The silicon compounds, in which, for example, z is an integer of 2, $R^8$ is an alkyl group and $R^9$ is an alkyl group include dimethyl dimethoxysilane, dimethyl diethoxysilane, di-n-propyl dimethoxysilane, di-iso-propyl dimethoxysilane, di-n-propyl diethoxysilane, di-iso-propyl diethoxysilane, di-n-butyl dimethoxysilane, di-iso-butyl dimethoxysilane, di-t-butyl dimethoxysilane, di-n-butyl diethoxysilane, n-butylmethyl dimethoxysilane, bis (2-ethylhexyl) dimethoxysilane, bis (2-ethylhexyl) diethoxysilane, and the like.

The silicon compounds, in which, for example, z is an integer of 2, $R^8$ is a cycloalkyl group and $R^9$ is an alkyl group, include dicyclohexyl dimethoxysilane, dicyclohexyl diethoxysilane, dicyclopentyl dimethoxysilane, dicyclopentyl diethoxysilane, cyclohexyl cyclopentyl dimethoxysilane, cyclohexyl cyclopentyl diethoxysilane and the like. The silicon compounds, in which, for example, z is an integer of 2, $R^8$ is a cycloalkyl/alkyl group and $R^9$ is an alkyl group, includes cyclohexylmethyl dimethoxysilane, cyclohexylmethyl diethoxysilane, cyclohexylethyl dimethoxysilane, cyclohexylisopropyl dimethoxysilane, cyclohexylethyl diethoxysilane, cyclopentylmethyl dimethoxysilane, cyclopentylethyl diethoxysilane, cyclohexyl (n-pentyl) dimethoxysilane, cyclopentylisobutyl dimethoxysilane, cyclohexyl (n-pentyl) diethoxysilane, cyclopentymethyl diethoxysilane, cyclohexyl (n-propyl) dimethoxysilane, cyclohexyl (n-butyl) dimethoxysilane, cyclohexyl (n-propyl) diethoxysilane, cyclohexyl (n-butyl) diethoxysilane and the like.

The silicon compounds, in which, for example, z is an integer of 2, $R^8$ is a phenyl group and $R^9$ is an alkyl group, include diphenyl dimethoxy silane, diphenyl diethoxysilane and the like. The silicon compounds, in which, for example, z is an integer of 2, $R^8$ is a phenyl/alkyl group and $R^9$ is an alkyl group, include phenylmethyl dimethoxysilane, phenylmethyl dimethoxysilane, phenylethyl diethoxysilane, phenylethyl dimethoxysilane, phenylethyl diethoxysilane and the like. The silicon compounds, in which, for example, z is an integer of 3, $R^8$ is a cycloalkyl/alkyl group and $R^9$ is an alkyl group, include cyclohexyldimethyl methoxysilane, cyclohexyldimethyl ethoxysilane, cyclohexyldiethyl methoxysilane, cyclohexyldiethyl ethoxysilane, 2-ethylhexyl trimethoxysilane, 2-ethylhexyl triethoxysilane and the like.

The silicon compounds, in which, for example, z is an integer of 1, $R^8$ is an alkyl group and $R^9$ is an alkyl group, include methyl trimethoxysilane, methyl triethoxysilane, ethyl trimethoxysilane, ethyl triethoxysilane, n-propyl trimethoxysilane, n-propyl triethoxysilane, iso-propyl trimethoxysilane, iso-propyl triethoxysilane, n-butyltrimethoxysilane, iso-butyl trimethoxysilane, t-butyl trimethoxysilane, n-butyltriethoxysilane and the like.

The silicon compounds, in which, for example, z is an integer of 1. $R^8$ is a cycloalkyl group and $R^9$ is an alkyl group, include cyclohexyl trimethoxysilane, cyclohexyl triethoxysilane, cyclopentyl trimethoxysilane, cyclopentyl triethoxysilane and the like. The silicon compounds, in which, for example, z is an integer of 1, $R^8$ is a vinyl group and $R^9$ is an alkyl group, include vinyl trimethoxysilane, vinyl triethoxysilane, 2-ethylhexyl triethoxysilane, 2-ethylhexyl triehtoxysilane and the like. The silicon compounds, in which, for example, z is an integer of 1. $R^8$ is a phenyl group and $R^9$ is an alkyl group, include phenyl trimethoxysilane, phenyl triethoxysilane and the like.

The silicon compounds, in which, for example, z is an integer of 0, $R^9$ is an alkyl group, include tetramethoxysilane, tetraethoxysilane, tetra-n-propoxysilane, tetra-iso-propoxysilane, tetra-n-butoxysilane, tetra-iso-butoxysilane and the like.

Of the above-described silicon compounds represented by the general formula (VII), the compounds of Z=2, $R^8$=C3–C4 alkyl and $R^9$=C1–C2 alkyl group; z=2, $R^8$=cyclohexyl and $R^9$ =C1–C2 alkyl; z=2, $R^8$=cyclohexyl, cyclpentyl or C1–C2 alkyl and $R^9$=C1–C2 alkyl; and z=2, $R^8$=neo-type C3–C4 alkyl and $R^9$=C1–C2 alkyl permit especially a polymer of a broad molecular weight distribution and high crystallinity to be prepared when being combined with the solid catalyst component [A2] or the present invention. More particularly, such ingredients include, for example di-n-propyl methoxysilane, di-iso-propyl dimethoxysilane, di-n-butyl dimethoxysilane, di-iso-butyl dimethoxysilane, di-t-butyl dimethoxysilane, di-n-butyl diethoxysilane, t-butyl trimethoxysilane, dicyclohexyl dimethoxysilane, dicyclhexyl diethoxysilane, cyclohexylmethyl dimethoxysilane, cyclohexylmethyl diethoxysilane, cyclohexylethyl dimethoxysilane, cyclohexylethyl diethoxysilane, dicyclopentyl dimethoxysilane, dicyclopentyl diethoxysilane, cyclopentylmethyl dimethoxysilane, cyclopentylmethyl diethoxysilane, cyclopentylethyl diethoxysilane n-butylmethyl dimethoxysilane, cyclohexylisopropyl dimethoxysilane, cyclopentylisopropyl dimethoxysilane, cyclopentylisobutyl dimethoxysilane, cyclohexyl cyclopentyl dimethoxysilane, cyclohexyl cyclopentyl diethoxysilane and the like. Of such ingredients, t-butyl trimethoxysilane, dicyclohexyl dimethoxysilane, dicyclopentyl dimethoxysilane, cyclopentylmethyl dimethoxysilane, n-butylmethyl dimethoxysilane, cyclohexylisopropyl dimethoxysilane, cyclopentylisopropyl dimethoxysilane, cyclopentylisobutyl dimethoxysilane, cyclohexyl cyclopentyl dimethoxy silane are particularly preferably used for this purpose. At least one of the compounds may be used.

In order to further improve a catalytic activity, stereoregularity of a polymer produced and properties of the polymer in polymerization of olefin carried out using the components [A2], [B2] and [C2], it is preferable to carry out propolymerization prior to the polymerizaiton. Ethylene and propylene, as well as monomers such as styrene, vinyl cyclohexane and the like may be used as a monomer for the prepolymerization.

The polymerization with use of the present catalyst system used either [A1] or [A2] may be carried out in the presence of or absence of an organic solvent. The olefin monomer used may be in the form of either gas or liquid. The temperature for the polymerization is generally 200° C. or below and preferably 100° C. or below. The pressure for the polymerization is generally 10 MPa or below and preferably 5 MPa or below.

Olefins which are subject to homopolymerization or copolymerization according to the present invetnion are preferably alpha olefins including ethylene, propylene, 1-butene, 4-methyl-1-pentene and the like.

The amount of each of the components [A2], [B2] and [C2] used in the polymerization and propolymerization may be represented by a molar ratio per a titanium atom in the solid catalyst component [A2]. More particularly, the component [B2] and [C2] are used at the molar ratios of 5 to 1000 and 0.002 to 0.5, respectively. The polymerization may take place in the presence of an organic solvent or without it. A temperature for the polymerization is set to be 200° C. or less and preferably 100° C. or less and a pressure therefor is set to be 10 MPa or less and preferably 5 MPa or less.

In accordance with the present invention, one or more of the above-specified materials included in the organic silicon compound [C1] or [C2] is selected, so that polyolefins which have a broad molecular weight distribution sufficient to permit a numerical value obtained by dividing a weight-average molecular weight (Mw) by a number-average molecular weight (Mn) to be improved by 2 or more and a extremely high crystalinity while keeping yields of a stereoregular polymer at a high level, as compared with polyolefins prepared according to the conventional process known in the art may be obtained with high yields.

Now, the present invention will be understood more readily with reference to the following examples and comparative examples, however, these are intended to illustrate the invention and are not to be construed to limit the scope of the invention.

EXAMPLE 1

(Preparation of Solid Catalyst Component [A2])

A round flask having an internal volume of 500 ml and equipped with a stirrer was flushed with nitrogen gas. The flask was charged with 10 g of diethoxy magnesium and 80 ml of toluene to form a suspension. Then, 20 ml of $TiCl_4$ was added to the susupension, the temperature was then gradually raised to 60° C. Then, 1.0 ml of diethyl phthalate was added to the susupension, temperature was then gradually increased to 110° C. Subsequently, 2.5 ml of diisooctyl phthalate was added to the suspension, which was further heated to a temperature of 112° C. A period of time as long as about 1.5 hours was required for heating the suspension to this temperature. Then, the temperature of the suspension was kept at 112° C., during which the suspension was reacted with the diethyl phthalate and diisooctyl phthalate for 1.5 hours, resulting in obtaining a reaction product. After the reaction was completed the reaction product was washed twice with 100 ml of toluene (per wash) at 90° C. and 20 ml of $TiCl_4$ and 80 ml of toluene were added to tile reaction product, which was then heated to 100° C., to thereby carry out reaction therebetween for 2 hours while stirring. After the reaction, the resultant product was washed with 100 ml of n-heptane at 40° C. 10 times, resulting in a solid catalyst component being obtained. Solid and liquid materials in the solid catalyst component were separated from each other and then the solid material was subject to Ti analysis. The solid catalyst component cantained 3.05% by weight of Ti.

(Preparation of Polymerization Catalyst and Polymerization)

An autoclave having an Internal volume of 2.0 liters and equipped with a stirrer was flushed with nitrogen gas. The autoclave was charged with 1.32 mmol of triethyl aluminum, 0.13 mmol of dicyclohexyldimethoxy silane and 0.0066 mmol of the solid catalyst component (A2) based on a Ti atom, to thereby prepare a polymarization catalyst. Then, the autoclave was charged with 1.8 liters of hydrogen gas and 1.4 liters of liquified propylene and the polymerization reaction performed for 30 minute at 70° C., resulting in a polymer of a weight (A) being produced. The resultant polymer was subject to extraction for 6 hours using boiling n-heptane to obtain a polymer of a weight (B) insoluble in n-heptane.

The polymerization activity (C) per gram of the solid catalyst component used is represented by the following expression:

$(C)=(A)(g)/$amount of solid catalyst component $(g)$

A yield (D) of a total crystalline polymer is represented by the following expression:

$(D)=(B)/(A)\times 100(\%)$

The values (A) to (D) obtained are listed on Table 2 together with an MI (E) of the polymer produced and its molecular-weight distribution (F).

EXAMPLE 2

(Preparation of Solid Catalyst Component [A1])

A round flask having an internal volume of 500 ml and equipped with a stirrer was flushed with nitrogen gas. The flask was then charged with 10 g of diethoxy magnesium and 80 ml of toluene to form a suspension. Then, 20 ml of $TiCl_4$ was added to the suspension, which was then heated to a temperature of 90° C. Then, 2.7 ml of di-n-butyl phthalate was added to the suspension, the temperature was then increased to 115° C. to carry out reaction therebetween for 2 hours while stirring, resulted in a solid reaction product. After the reaction was completed, the reaction product was washed with 100 ml of toluene at 90° C. twice and 20 ml of $TiCl_4$ and 80 ml of toluene were added to the reaction product, which was then heated to 115° C. to thereby carry out reaction therebetween for 2 hours while stirring. After the reaction, the resultant product was washed with 100 ml of n-heptane at 40° C. 10 times, resulting in a solid catalyst component being obtained. Solid and liquid materials in the solid catalyst component were separeated from each other and then the solid material was subject to Ti analysis, which revealed that the solid catalyst component contained 2.61% by weight of Ti.

(Preparation of Polymerizing Catalyst and Polymerization)

The procedure in Example 1 was repeated except that the solid catalyst component prepared according to the above-described procedure in Example 2 was used. The results are shown in Table 2.

EXAMPLE 3

(Preparation of Solid Catalyst Component [A1])

1 liter stainless steel vibration mill was flushed with nitrogen gas and charged with 100 g of magnesium dichloride and 24.5 ml of di-n-butyl phthalate, which were subject to grinding for 20 hours. Then, the mill was charged with 200 ml of toluene and grinding was further carried out for 3 hours, to thereby obtain a ground product. To the ground product, 1030 ml of toluene and 46 ml of toluene solution in which 6.9 g of polystyrene was dissolved were mixed together with stirring, to thereby form a mixture. The resultant mixture was subject to spray drying using a CL-8 Type pin-type disc atomizer to obtain a dried product. 10 g of the dried product is charged together with 100 ml of $TiCl_4$ into a round flask equipped with a stirrer previously flushed with nitrogen gas, to form a suspension. Then, the suspension was gradually heated to 100° C., and held at that temperature for two hours to obtain a reactin product. After the reaction, the reaction system was cooled to 90° C. and then supernatant liquid was removed from the reactin product. Thereafter, 100 ml of $TiCl_4$ was added to the reaction system, which was gradually heated to 100° C., the reaction was carried out for 2 hours to obtain a product. The product was then washed with 100 ml of n-heptane at 40° C. 10 times to provide a solid catalytic component. The content of Ti in the solid catalytic component was 1.50% by weight.

(Preparation of Polymerization Catalyst and Polymerization)

The polymerization procedure described in Example 1 was repeated using the solid catalyst component prepared in accordance with Example 3. The results were shown in Table 2.

EXAMPLE 4

(Preparation of Solid Catalyst Component [A1])

1 liter stainless steel vibration mill was flushed with nitrogen gas and charged with 30 g of magnesium dichloride and 7.7 ml of diethyl phthalate, which were then subject to grinding for 17 hours, to thereby obtain a ground product. Then, 10 g of the ground product, 80 ml of toluene and 20 ml of $TiCl_4$ were charged into a round flask equipped with a stirrer previously flushed with nitrogen and then gradually heated to a temperature of 110° C., at which the charged materials were subject to reaction for 2 hours to obtain a reaction product. After the reaction, the product was washed with 100 ml of n-heptane at 40° C. ten times to obtain a solid catalyst component. The content of Ti in the resultant catalyst component was 2.22% by weight.

(Preparation of Polymerization Catalyst and Polymerization)

The procedure described in Example 1 was repeated using the solid catalyst component prepared above. The results were shown in Table 2.

EXAMPLE 5

(Preparation of Soled Catalyst Component [A1])

A round flask having an internal volume of 500 ml and equipped with a stirrer was flushed with nitrogen gas. The flask was then charged with 30 ml of toluene and 20 ml of $TiCl_4$, to thereby obtain a mixture solution. Then, a suspension formed of 10 g of spherical diethoxy magnesium, 50 ml of toluene and 3.6 ml of di-n-butyl phthalate was added to the solution over 4 hours while the solution was kept at 20° C. and the solution was raised to a temperature of 90° C., at which temperature the solution was subject to reaction for 1 hour while being stirred, to obtain a reaction product. After completion of the reaction, the resultant reaction product was washed with 100 ml of boiling toluene twice and then 20 ml of $TiCl_4$ and 80 ml of toluene were added to the reaction product to carry out reaction therebetween at 110° C. for 2 hours while being stirred, resulting in a reaction product. Subsequently, the product was washed with 200 ml of n-heptane at 40° C. ten times, leading to a solid catalyst component. The content of Ti in the solid catalyst component was 2.54% by weight.

(Preparation of Polymerization Catalyst and Polymerization)

The procedure described in Example 1 was repeated using the solid catalyst component prepared above. The results were shown in Tasble 2.

EXAMPLE 6

(Preparation of Solid Catalyst Component [A1])

A round flask having an internal volume of 500 ml and equipped with a stirrer was flushed with nitrogen gas. The flask was then charged with 10 g of diethoxy magnesium and 60 ml of toluene to form a suspension. Then, 40 ml of $TiCl_4$ was added to the suspension, which was then heated to a temperature of 90° C. Then, 2.0 ml of phthaloyl dichloride was added to the suspension, the temperature was then increased to 115° C. to carry out reaction therebetween for 2 hours while stirring, resulting in a reaction product. After completion of the reaction, the reaction product was washed with 200 ml of toluene at 90° C. twice and 60 ml of toluene and 40 ml of $TiCl_4$ were added to the reaction product, which was then heated to 115° C., and held at that temperature for 2 hours while stirring. After the reaction, the resulting product was washed with 200 ml of n-heptane at 40° C. 10 times, resulting in a solid catalyst component being obtained. The content of Ti in the resultant solid catalyst component was 3.59% by weight.

(Preparation of Polymeribation Catalyst and Polymerization)

The procedure described in Example 1 was repeated using the solid catalyst component described above. The results were shown in Table 2.

EXAMPLE 7

(Preparation of Solid Catalyst Component [A1])

A round flask having an internal volume of 500 ml and equipped with a stirrer was flushed with nitrogen gas. The flask was then charged with 10 g of diethoxy magnesium and 60 ml of toluene to form a suspension. Then, 40 ml of $TiCl_4$ was added to the suspension, which was then heated to a temperature of 90° C. Then, 2.0 ml of phthaloyl dichloride was added to suspension, of which a temperature was then increased to 115° C. to carry out reaction therebetween for 2 hours while stirring, resulting in a solid catalyst material. After completion of the reaction, the resultant material was washed with 200 ml of toluene at a boiling temperature twice, and 60 ml of toluene and 40 ml of $TiCl_4$ were added to the material, which was then heated to 115° C., to thereby carry out reaction therebetween for 2 hours while stirring. This step was repeated three times, resulting in obtaining a reaction product. Thereafter, the reaction product was washed with 200 ml of n-heptane at 40° C. 10 times, resulting in a solid catalyst component being obtained. A content of Ti in the resultant solid catalyst component was 2.00% by weight.

(Preparation of Polymerization Catalyst and Polymerization)

The procedure described in Example 1 was repeated that the solid catalyst component described above was used in an amount of 0.0033 mmol based on a Ti atom for preparation of a polymerization catalyst. The results were as shown in Table 2.

Comparative Example 1

The procedure described in Example 2 was repeated except that dicyclohexyldimethoxy silane used for polymerization was replaced with phenyltriethoxy silane. The results were shown in Table 2.

Comparative Example 2

The procedure described in Example 2 was repeated except that dicyclohexyldimethoxy silane used for polymerization was replaced with allyltriethoxy silane. The results were shown in Table 2.

Comparative Example 3

The procedure described in Example 4 was repeated except that dicyclohexyldimethoxy silane used for polymerization was replaced with phenyltriethoxy silane. The results were shown in Table 2.

Comparative Example 4

The procedure described in Example 6 was repeated except that dicyclohexyldimethoxy silane used for polymerization was replaced with phenyltriethoxy silane. The results were shown in Table 2.

Comparative Example 5

The procedure described in Example 7 was repeated except that dicyclohexyl dimethoxysilane used for polymerization was replaced with phenyltriethoxy silane. The results were shown in Table 2.

Comparative Example 6

The procedure described in Example 1 was repeated except that dicyclohexyldimethoxy silane used for polymerization was replaced with cyclohexylmethyl dimethoxy silane. The results were shown in Table 2.

Comparative Example 7

The procedure described in Example 2 was repeated except that dicyclohexyldimethoxy silane used for polymerization was replaced with cyclohexylmethyl dimethoxy silane. The results were shown in Table 2.

Comparative Example 8

The procedure described in Example 3 was repeated except that dicyclohexyldimethoxy silane used for polymerization was replaced with cyclohexylmethyl dimethoxy silane. The results were shown in Table 2.

Comparative Example 9

The procedure described in Example 4 was repeated except that dicyclohexyldimethoxy silane used for polymerization was replaced with cyclohexylmethyl dimethoxy silane. The results were shown in Table 2.

Comparative Example 10

The procedure described in Example 5 was repeated except that dicyclohexyldimethoxy silane used for polymerization was replaced with cyclohexylmethyl dimethoxy silane. The results were shown in Table 2.

Comparative Example 11

The procedure described in Example 6 was repeated except that dicyclohcxyldimethoxy silane used for polymerization was replaced with cyclohexylmethyl dimethoxy silane. The results were shown in Table 2.

Comparative Example 12

The procedure described in Example 7 was repeated except that dicyclohexyldimethoxy silane used for polymerization was replaced with cyclohexylmethyl dimethoxy silane. The results were shown in Table 2.

Comparative Example 13

The procedure described in Example 5 was repeated except that dicyclohexyldimethoxy silane used for polymerization was replaced with dicyclopentyldimethoxy silane. The results were shown in Table 2.

EXAMPLE 8

(Preparation of Solid Catalyst Component [A2])

80 ml of toluene was introduced into a flask fully purged with nitrogen and then 10 g of diethoxy magnesium was charged therein, resulting in a suspension being formed, which was stirred at a room temperature for 10 minutes. Then, $TiCl_4$ was added in an amount of 20 ml to the suspension and then gradually heated. When a temperature of the contents was raised to 62° C., diethyl phthalate was added in an amount of 1.0 ml thereto, followed by heating. When a temperature of the contents reached 110° C., 3.5 ml of bis (2-ethylhexyl) phthalate was added thereto. Subsequently, the contents were further heated to 112° C., at which a reaction was carried out for 2 hours. After completion of the reaction, the resultant reaction product was washed with 100 ml of toluene twice. Then, 20 ml of $TiCl_4$ and 80 ml of toluene were added to the product, which was subject to a reaction at 100° C. for 2 hours. After the reaction, the resultant reaction product was washed with 100 ml of n-heptane ten times, resulting in providing a solid catalyst component of the present invention. The solid catalyst component was subject to solid-liquid separation, to thereby provide a solid fraction of the component. Analysis of the solid fraction indicated that it contains 2.46 wt % of Ti, 18.0 wt % of Mg, 62.0 wt % of chlorine, 6.24 wt % of diethyl phthalate, 2.90 wt % of ethyl (2-ethylhexyl) phthalate and 2.50 wt % of bis (2-ethylhexyl) phthalate.

(Polymerization)

An autoclave of 2 liters in internal volume which is equipped with a stirrer was purged with nitrogen gas and charged with 1.32 mmol triethyl aluminum, 0.13 mmol dicyclohexyl dimethoxy silane and the above-described solid catalyst component in an amount of 0.0066 mmol based on the Ti atom. Then, 1.01 of hydrogen gas and 1.41 of liquefied propylene were charged in the autoclave, leading to a polymerization reaction at 70° C. for 30 minutes. The polymerization reaction produced a polymer of 250.0 g. The polymer was subject to extraction for 6 hours using boiled n-heptane, resulting in a polymer insoluble in n-heptane being obtained in an amount of 4.91 g.

The solid catalyst component which was used exhibited a polymerization activity of 19.500 g/g. Yields of the whole crystalline polymer were 98.3%. The polymer produced had an MI of 3.5 g/10 min. Also, the polymer product had a melting point of 163.0° C. and a molecular weight distribution of 6.5.

EXAMPLE 9

The procedure of Example 8 described above was substantially repeated except that di-iso-decyl phthalate was substituted for bis (2-ethylhexyl) phthalate. The resultant solid catalyst component contained 2.93 wt % of Ti. 18.3 wt % of Mg, 62.5 wt % of chlorine, 7.53 wt % of diethyl phthalate, 0.51 wt % of iso-decylethyl phthalate and 1.78 wt % of di-iso-decyl phthalate.

The solid catalyst component exhibited a polymerization activity of 18,600 g/g. Yields of the whole crystalline polymer were 98.5%. The polymer produced had an MI of 2.5 g/10 min. Also, the polymer product had a melting point of 162.5° C. and a molecular weight distribution of 6.2.

EXAMPLE 10

The procedure of Example 8 described above was substantially repeated except that 2.5 ml of Vinisizer 85 manufactured by Kao Kabushiki Kaisha which is a mixture of diester of phthalic acid of which alkyl groups have 6 to 12 carbon atoms was substituted for bis (2-ethylhexyl) phthalate. The resultant solid catalyst component contained 3.03 wt % of Ti, 18.5 wt % of Mg, 62.8 wt % of chlorine, 6.23 wt % of diethyl phthalate, 0.27 wt % of ethyl (n-octyl) phthalate and 1.78 wt % of remaining ester of phthalic acid.

The solid catalyst component exhibited a polymerization activity of 19,400 g/g. Yields of the whole crystalline polymer were 98.2%. The polymer produced had an MI of 2.4 g/10 min. Also, the polymer product had a melting poingt of 162.8° C. and a molecular weight distribution of 7.8.

EXAMPLE 11

(Preparation of Solid Catalyst Component [A2])

80 ml of toluene was introduced into a flask fully purged with nitrogen and then 10 g of diethoxy magnesium was charged therein, resulting in a suspension being formed, which was stirred at a room temperature for 10 minutes. Then, $TiCl_4$ was added in an amount of 20 ml to the suspension and then gradually heated. When a temperature of the contents was raised to 62° C., diethyl phthalate was added in an amount of 1.0 ml thereto, followed by heating. When a temperature of the contents reached 110° C., 3.5 ml of bis (2-ethylhexyl) phthalate was added thereto. Then, 1.0 ml of di-iso-decyl adipate which acts as an electron donor compound was added at 112° C. Subsequently, the contents were further heated to 112° C., at which a reaction was carried out for 2 hours. After completion of the reaction, the resultant reaction product was washed with 100 ml of toluene twice. Then, 20 ml of $TiCl_4$ and 80 ml of toluene were added to the product, which was then subject to a reaction at 100° C. for 2 hours. After the reaction, the resultant reaction product was washed with 100 ml of n-heptane ten times, resulting in a solid catalyst component of the present invention. The solid catalyst component was subject to solid-liquid separation, to thereby provide a solid fraction of the component. Analysis of the solid fraction indicated that it contains 2.70 wt % of Ti, 17.9 wt % of Mg, 61.8 wt % of chlorine, 6.50 wt % of diethyl phthalate, 2.80 wt % of ethyl (2-ethylhexyl) phthalate and 2.60 wt % of bis (2-ethylhexyl) phthalate.

(Polymerization)

The polymerization was carried out in substantially the same manner as in Example 1. The solid catalyst component exhibited a polymerization activity of 17,500 g/g. Yields of the whole crystalline polymer were 98.1%. The polymer produced had an MI of 6.5 g/10 min. Also, the polymer product had a melting point of 162.6° C. and a molecular weight distribution of 6.9.

EXAMPLE 12

Polymerization of propylene took place according to substantially the same procedure as in Example 8, except that cyclohexylmethyl dimethoxysilane was substituted for dicyclohexyl dimethoxy silane. The resultant product exhibited a polymerization activity of 23,400 g/g. Yields of the whole crystalline polymer were 98.5%. The polymer produced had an MI of 3.0 g/10 min. Also, the polymer product had a melting point of 162.5° C. and a molecular weight distribution of 6.0.

As can be seen from the foregoing, polyolefins prepared according to the first present invention have a molecular-weight distribution increased in value obtained by dividing a weight average molecular weight ($\overline{Mw}$) by a number-average molecular weight ($\overline{Mn}$) by at least 2 or more, as compared with polyolefins prepared by the prior art, resulting in being effectively directed to a wide variety of applications.

Also, polyolefins prepared by the present invention exhibit an increased polymerization activity based on a catalyst component and is increased in yield while being significantly improved in stereoregularity, to thereby exhibit much industrial utility.

Such advantages of the present invention are accomplished by the process of the present invention for polymerizing olefins in the presence of a catalyst of a high activity which does not employ multi-stage polymerization method or the method using two types of organic silicon compounds as described above in connection with the prior art but uses only one selected from the organic silicon compounds specified by the general formula $Si(C_6H_{11})_2(OR^0)_2$ wherein $C_6H_{11}$ is a cyclohexyl group and $R^0$ is an alkyl group having 1 to 5 carbon atoms.

While the present invention has been described with a certain degree of particularity with reference to the examples, obvious modifications and variations are possible in light of the above teachings. It is therefore to be understood that within the scope of the appended claims, the invention may be practiced otherwise than as specifically described.

While the present invention has been discribed with a certain degree of particularity with reference to the examples, obvious modifications and variations are possible in light of the above teachings. It is therefore to be understood that within the scope of the appended claims, the

TABLE 1

COMPOSITION OF THE CATALYST COMPONENT

| Ex. No. | Ti weight % | Mg weight % | Cl weight % | Phthalic diester (weight %) | | |
|---|---|---|---|---|---|---|
| | | | | (e) component | (f) component | (g) component |
| 1 | 3.05 | — | — | — | — | — |
| 2 | 2.61 | — | — | — | — | — |
| 3 | 1.50 | — | — | — | — | — |
| 4 | 2.22 | — | — | — | — | — |
| 5 | 2.54 | — | — | — | — | — |
| 6 | 3.59 | — | — | — | — | — |
| 7 | 2.00 | — | — | — | — | — |
| 8 | 2.46 | 18.0 | 62.0 | diethylphthalate 6.24 | ethyl(2-ethylhexyl)-phthalate 2.90 | bis(2-ethylhexyl)-phthalate 2.50 |
| 9 | 2.93 | 18.3 | 62.5 | diethylphthalate 7.53 | iso-decylethylphthalate 0.51 | di-iso-decylphthalate 1.78 |
| 10 | 3.03 | 18.5 | 62.8 | diethylphthalate 6.23 | ethyl(n-octyl)phthalate 0.27 | other phthalates 3.89 |
| 11 | 2.70 | 17.9 | 61.8 | diethylphthalate 6.50 | ethyl(2-ethylhexyl) phthalate 2.80 | bis(2-ethylhexyl) phthalate 2.60 |

TABLE 2

POLYMERIZATION OF PROPYLENE

| Ex. No. | Total Amount of Polymer (A) g | Amount of Polymer Insoluble in Boiling n-Heptane (B) g | Polymerization Activity per Solid Catalyst Component (C) g/g | Yield of Total Crystalline Polymer (D) % | MI of Polymer Produced (E) g/10 min. | Molecular Weight Distribution of polymer Produced (F) Mw/Mn | Melting Point of Polymer Produced C |
|---|---|---|---|---|---|---|---|
| 1 | 233.2 | 229.5 | 22,500 | 98.4 | 5.0 | 7.8 | 161.9 |
| 2 | 278.6 | 272.7 | 23,000 | 98.4 | 4.6 | 6.0 | — |
| 3 | 210.8 | 200.6 | 10,000 | 95.2 | 3.5 | 7.7 | — |
| 4 | 148.1 | 143.1 | 10,400 | 96.6 | 6.0 | 6.0 | — |
| 5 | 280.0 | 274.1 | 22,500 | 97.9 | 5.2 | 6.4 | — |
| 6 | 193.7 | 189.9 | 22,000 | 98.0 | 4.9 | 6.1 | — |
| 7 | 442.6 | 434.6 | 56,000 | 98.2 | 3.4 | 6.2 | — |
| 8 | 250.5 | 246.2 | 19,500 | 98.3 | 3.5 | 6.5 | 163.0 |
| 9 | 200.6 | 197.6 | 18,600 | 98.5 | 2.5 | 6.2 | 162.5 |
| 10 | 202.3 | 198.7 | 19,400 | 98.2 | 2.4 | 7.8 | 162.8 |
| 11 | 182.5 | 179.0 | 17,500 | 98.1 | 6.5 | 6.9 | 162.6 |
| 12 | 300.6 | 296.1 | 23,400 | 98.5 | 3.0 | 6.0 | 162.5 |
| comp. 1 | 284.6 | 280.4 | 23,500 | 98.5 | 6.0 | 4.0 | 162.1 |
| comp. 2 | 192.6 | 189.7 | 15,900 | 98.5 | 9.0 | 4.0 | — |
| comp. 3 | 141.0 | 133.5 | 9,900 | 94.7 | 18.0 | 3.9 | — |
| comp. 4 | 202.5 | 198.5 | 23,000 | 98.0 | 5.0 | 4.0 | — |
| comp. 5 | 454.5 | 446.7 | 57,500 | 98.3 | 3.0 | 3.9 | — |
| comp. 6 | 280.9 | 275.0 | 27,100 | 97.9 | 5.1 | 5.4 | 162.0 |
| comp. 7 | 359.8 | 354.8 | 29,700 | 98.6 | 6.5 | 3.9 | — |
| comp. 8 | 225.5 | 215.1 | 10,700 | 95.4 | 2.4 | 5.3 | — |
| comp. 9 | 165.2 | 158.4 | 11,600 | 95.9 | 12.2 | 4.0 | — |
| comp. 10 | 342.3 | 337.5 | 27,500 | 98.6 | 8.0 | 4.0 | — |
| comp. 11 | 273.9 | 269.0 | 31,100 | 98.2 | 5.5 | 4.1 | — |
| comp. 12 | 515.4 | 566.2 | 72,800 | 98.4 | 5.0 | 4.0 | — |
| comp. 13 | 419.4 | 414.0 | 33,700 | 98.7 | 2.8 | 5.9 | — |

What is claimed as new and desired to be secured by Letters Patent of the United States is:

1. A catalyst for preparing polyolefins with a broad molecular weight distribution, consisting essentially of a solid catalyst component A1, an organic aluminum compound B1, and an organic silicon compound C1 having the formula:

$$Si(C_6H_{11})_2(OR^0)_2$$

wherein $C_6H_{11}$ is a cyclohexyl group and $R^0$ is a an alkyl group having 1 to 5 carbon atoms, said polyolefin has a molecular weight distribution of 6 or more, and wherein said solid catalyst component A1 is prepared by a process comprising the steps of:

(i) suspending a dialkoxyl magnesium in an aromatic hydrocarbon, (ii) contacting and reacting said dialkoxyl magnesium with a diester of phthalic acid and titanium tetrachloride to obtain a solid material, washing said solid material with an aromatic hydrocarbon, and (iii) contacting said washed solid material with titanium tetrachloride.

2. The catalyst of claim 1, wherein said organic silicon compound C1 is dicyclohexyldimethoxysilane.

3. The catalyst of claim 1 wherein said dialkoxy magnesium is diethoxy magnesium.

4. The catalyst of claim 1, wherein said dialkoxy magnesium is spherical dialkoxy magnesium.

5. The catalyst of claim 1, wherein said dialkoxy magnesium is spherical diethoxy magnesium.

6. The catalyst of claim 1, wherein the volume ratio of said titanium tetrachloride in contacting step (ii) is 1 or less to the aromatic hydrocarbon.

7. The catalyst of claim 1, wherein said reaction is carried out at a temperature of from 80° C. to 125° C.

8. A solid catalyst component A2 for olefin polymerization prepared by contacting together a Mg compound (a) represented by the following general formula (II):

$$Mg(OR^1)_{2-m}X_m \quad (II)$$

wherein $R^1$ indicates at least one selected from the group consisting of alkyl groups having 1 to 4 carbon atoms and phenyl groups, X is halogen atom such as chlorine, bromine or iodine and m is an integer of 0 or 1;

a titanium compound (b) represented by the following general formula (III);

$$Ti(OR^2)_nX_{4-n} \quad (III)$$

wherein $R^2$ is an alkyl group having 1 to 4 carbon atoms, X is halogen atom such as chlorine, bromine or iodine and n is an integer of 0, 1 or 2;

at least one diester of phthalic acid (c) represented by the following general formula (IV);

$$\phi(COOR^3)(COOR^4) \quad (IV)$$

wherein $\phi$ indicates a phenyl group. $R^3$ and $R^4$ each are an alkyl group having 1 to 4 carbon atoms and are identical with or different from each other; and at least one diester of phthalic acid (d) represented by the following general formula (V):

$$\phi(COOR^5)(COOR^6) \quad (V)$$

wherein $R^5$ and $R^6$ each are an alkyl group having 4 to 12 carbon atoms, in which the number of carbon atoms in total in $R^5$ and $R^6$ is 10 to 20, and are identical with or different from each other.

9. The solid catalyst component A2 as defined in claim 9, wherein said titanium compound (b) is titanium tetrahalide.

10. A solid catalyst component A2 as defined in claim 9, wherein a difference between the total number of carbon atoms of $R^3$ and $R^4$ in the diester of phthalic acid (c) and that of $R^5$ and $R^6$ in the diester of phthalic acid (d) is 6 or more.

11. The solid catalyst component A2 as defined in claim 8, wherein said component prepared by contacting said magnesium compound (a), said titanium compound (b) and two different diesters of phthalic acid (c) and (d) contains at least three types of diester of phthalic acid ingredients (e), (f) and (g) represented by the following general formulas (VIII); (IX) and (X), respectively:

$$\phi(COOR^{10})(COOR^{11}) \quad (VIII)$$

wherein $R^{10}$ and $R^{11}$ each are an alkyl group having 1 to 4 carbon atoms and are identical with or different from each other;

$$\phi(COOR^{14})(COOR^{15}) \quad (IX)$$

wherein $R^{14}$ and $R^{15}$ are an alkyl group having 1 to 12 carbon atoms, and $R^{14}$ and $R^{15}$ are identical with or different from each other; and $$\phi(COOR^{12})(COOR^{13}) \quad (X)$$

wherein $R^{12}$ and $R^{13}$ each are an alkyl group having 4 to 12 carbon atoms, in which the number of carbon atoms in total in $R^{12}$ and $R^{13}$ is 10 to 20, and are identical with or different from each other.

12. The solid catalyst component A2 as difined in claim 11, wherein the contents of said ingredients (e), (f) and (g) in said solid catalyst component are 1 to 15 weight %, 0 to 10 weight % and 0.5 to 15 weight %, respectively.

13. The solid catalyst component A2 as defined in claim 11, wherein the contents of said ingredients (e), (f) and (g) in said solid catalyst component are 5 to 50 parts by weight in total.

14. A catalyst system for olefin polymerization comprising:

a solid catalyst component A2 prepared by contacting together a Mg compound (a) represented by the following general formula (II):

$$Mg(OR^1)_{2-m}X_m \quad (II)$$

wherein $R^1$ indicates at least one selected from the group consisting of alkyl groups having 1 to 4 carbon atoms and phenyl groups, X is a chlorine or a bromine, and m is an integer of 0 or 1;

a titanium compound (b) represented by the following general formula (III);

$$Ti(OR^2)_nX_{4-n} \quad (III)$$

wherein $R^2$ is an alkyl group having 1 to 4 carbon atoms and n is an integer of 0, 1 or 2;

at least one diester of phthalic acid (c) represented by the following general formula (IV);

$$\phi(COOR^3)(COOR^4) \quad (IV)$$

wherein $\phi$ indicates a phenyl group, $R^3$ and $R^4$ each are an alkyl group having 1 to 4 carbon atoms and may be identical with or different from each other; and at least one diester of phthalic acid (d) represented by the following general formula (V):

$$\phi(COOR^5)(COOR^6) \quad (V)$$

wherein $R^5$ and R 6 each are an alkyl group having 4 to 12 carbon atoms, in which the number of carbon atoms in total is 10 to 20, and may be identical with or different from each other; a component B2 which is at least one organic aluminum compound represented by the following general formula (VI):

$$R^7_yAlY_{3-y} \quad (VI)$$

wherein $R^7$ is an alkyl group having 1 to 4 carbon atoms, Y is any one of hydrogen, chlorine, bromine and iodine, and y is in the range of $0<y\leq3$; and a component C2 which is at least one silicon compound represented by the following general formula (VII):

$$R^8_z Si(OR^9)_{4-z} \qquad (VII)$$

wherein $R^8$ is selected from the group consisting of an alkyl group, a cycloalkyl group, a phenyl group, a vinyl group, an aryl group and an aralkyl group and may be identical or different; $R^9$ is selected from the group consisting of an alkyl group having 1 to 4 carbon atoms, a cycloalkyl group, a phenyl group, a vinyl group, an allyl group and an aralkyl group and may be identical or different; and z is an integer of 0 to 3.

15. The catalyst system as defined in claim 14, wherein said component B2 is trialkyl aluminum.

16. The catalyst system as defined in claim 14, wherein said component C2 is cycloalkyl alkoxysilane.

17. The catalyst system as defined in claim 14, wherein said component C2 is dicycloalkyl dialkoxysilane.

18. The catalyst system as defined in claim 14, wherein said component C2 is dialkyl dialkoxysilane.

19. The catalyst system as defined in claim 14, wherein said component C2 is alkyl trialkoxysilane.

20. The catalyst system as defined in claim 14, wherein said component C2 is tetraalkoxysilane.

21. The catalyst system as defined in claim 14, wherein said component C2 is at least one selected from the group consisting of di-n-propyl dimethoxysilane, di-iso-propyl dimethoxy silane, di-n-butyl dimethoxy silane, di-iso-butyl dimethoxysilane, di-t-butyl dimethoxysilane, di-n-butyl diethoxyslIane, t-butyl trimethoxysilane, dicyclohexyl dimethoxysilane, dicyclohexyl diethoxysilane, cyclohexylmethyl dimethoxysilane, dicyclohexyl diethoxysilane, cyclohexylmethyl diethoxysilane, cyclohexylethyl dimethoxysilane, cyclohcxylethyl diethoxysilane, dicyclopentyl dimethoxysilane, dicyclopentyl diethoxysilane, cyclopentylmethyl dimethoxysilane, cyclopentylmethyl diethoxysilane, cyclopentylethyl diethoxysilane, n-butylmethyl dimethoxysilane, cyclohexyl(iso-propyl) dimethoxysilane, cyclopentyl(iso-propyl) dimethoxysilane, cyclopentyl-(iso-butyl) dimethoxysilane and cyclohexylcyclopentyl dimethoxysilane.

* * * * *